(12) United States Patent
Yuan et al.

(10) Patent No.: US 10,999,322 B1
(45) Date of Patent: May 4, 2021

(54) ANTI-PHISHING SYSTEM AND METHOD USING COMPUTER VISION TO MATCH IDENTIFIABLE KEY INFORMATION

(71) Applicant: Trend Micro Incorporated, Tokyo (JP)

(72) Inventors: Quan Yuan, Nanjing (CN); Jing Cao, Nanjing (CN); Bo Liu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 300 days.

(21) Appl. No.: 15/840,378

(22) Filed: Dec. 13, 2017

(51) Int. Cl.
| | |
|---|---|
| H04L 12/58 | (2006.01) |
| H04L 29/06 | (2006.01) |
| G06K 9/62 | (2006.01) |
| G06F 16/583 | (2019.01) |
| G06F 16/955 | (2019.01) |
| G06F 40/10 | (2020.01) |

(52) U.S. Cl.
CPC ........ *H04L 63/1483* (2013.01); *G06F 16/583* (2019.01); *G06F 16/955* (2019.01); *G06F 40/10* (2020.01); *G06K 9/6201* (2013.01)

(58) Field of Classification Search
CPC . H04L 63/1483; G06F 16/583; G06F 16/955; G06F 17/21; G06K 9/6201
See application file for complete search history.

(56) References Cited

U.S. PATENT DOCUMENTS

| | | | |
|---|---|---|---|
| 2016/0014151 A1* | 1/2016 | Prakash | H04L 63/1483 726/22 |
| 2017/0118243 A1 | 4/2017 | Yeh et al. | |
| 2017/0244755 A1 | 8/2017 | Tsao et al. | |
| 2018/0234368 A1* | 8/2018 | Everton | H04L 51/10 |
| 2019/0014149 A1* | 1/2019 | Cleveland | H04L 67/104 |

* cited by examiner

*Primary Examiner* — Noura Zoubair
(74) *Attorney, Agent, or Firm* — Okamoto & Benedicto LLP

(57) ABSTRACT

The presently-disclosed solution provides an innovative system and method to protect a computer user from a phishing attack. Computer vision is effectively applied to match identifiable key information in suspect content against a database of identifiable key information of legitimate content. In one embodiment, the presently-disclosed solution converts suspect content to a digital image format and searches a database of logos and/or banners to identify a matching logo/banner image. Once the matching logo/banner image is found, the legitimate domain(s) associated with the matching logo/banner image is (are) determined. In addition, the presently-disclosed solution extracts all the URLs (universal resource links) directly from the textual data of the suspect content and further extracts the suspect domain(s) from those URLs. The suspect domain(s) is (are) then compared against the legitimate domain(s) to detect whether the suspect content is phishing content or not. Other embodiments and features are also disclosed.

9 Claims, 5 Drawing Sheets

ANTI-PHISHING SYSTEM AND METHOD USING COMPUTER VISION TO MATCH IDENTIFIABLE KEY INFORMATION

BACKGROUND OF THE INVENTION

1. Field of the Invention

The present invention relates generally to computer security, and more particularly but not exclusively to methods and systems for detecting phishing to improve computer security.

2. Description of the Background Art

Various online services are available over the Internet. Examples of these online services include online banking, data storage, webmail, social networks, etc. Generally speaking, an online service may be accessed with appropriate credentials, such as a user identifier (e.g., username, email address, mobile phone number) and a password. An end user may obtain credentials upon creation of an online account with the online service. The online service may maintain a website that serves a webpage for entering credentials, which is referred to as a "login page."

The convenience provided by online services not only attracts legitimate end users but fraudsters as well. Fraudsters may gain access to an online account of a victim using a variety of techniques including by phishing. Phishing is a cyber attack that involves some form of misrepresentation. A fraudster may operate a malicious website or hijack a legitimate website to serve a phishing login page, which is a webpage that mimics the look and feel of a legitimate login page for the purpose of stealing the victim's credentials. The fraudster may direct the victim to the phishing login page by spam email, man-in-the-middle attack, etc. The phishing login page is made to look convincingly real to trick the victim into entering his credentials.

Current anti-phishing technologies generally focus on structural level checking. Such structural level checking may involve analysis of a mail header, body content, html layout or a combination of them. However, such structural level checking may be thwarted by hackers.

In particular, noise may be added to the phishing email or phishing website so as to hinder or obstruct the structural level checking. In one example of noise addition, hidden useless html elements may be inserted. As another example, a mixture of images and text may be used to construct meaningful sentences when viewed by the user. As a further example, legitimate cousin domains may be utilized (for example, trendmiccro.com, instead of trendmicro.com).

SUMMARY

The presently-disclosed solution provides an innovative system and method to protect a computer user from a phishing attack. Computer vision is effectively applied to match identifiable key information in suspect content against a database of identifiable key information of legitimate content.

In particular, applicant has observed that a company's logos and/or banners are consistently used in legitimate emails and websites. These logos and/or banners are visually present in phishing emails and websites by fraudsters so as to trick users into thinking that the emails and websites are legitimate.

In one embodiment, the presently-disclosed solution converts suspect content to a digital image format and searches a database of logos and/or banners to identify a matching logo/banner image. Once the matching logo/banner image is found, the legitimate domain(s) associated with the matching logo/banner image is (are) determined. In addition, the presently-disclosed solution extracts all the URLs (universal resource links) directly from the textual data of the suspect content and further extracts the suspect domain(s) from those URLs. The suspect domain(s) is (are) then compared against the legitimate domain(s) to detect whether the suspect content is phishing content or not.

Other embodiments and features of the present invention are also disclosed.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
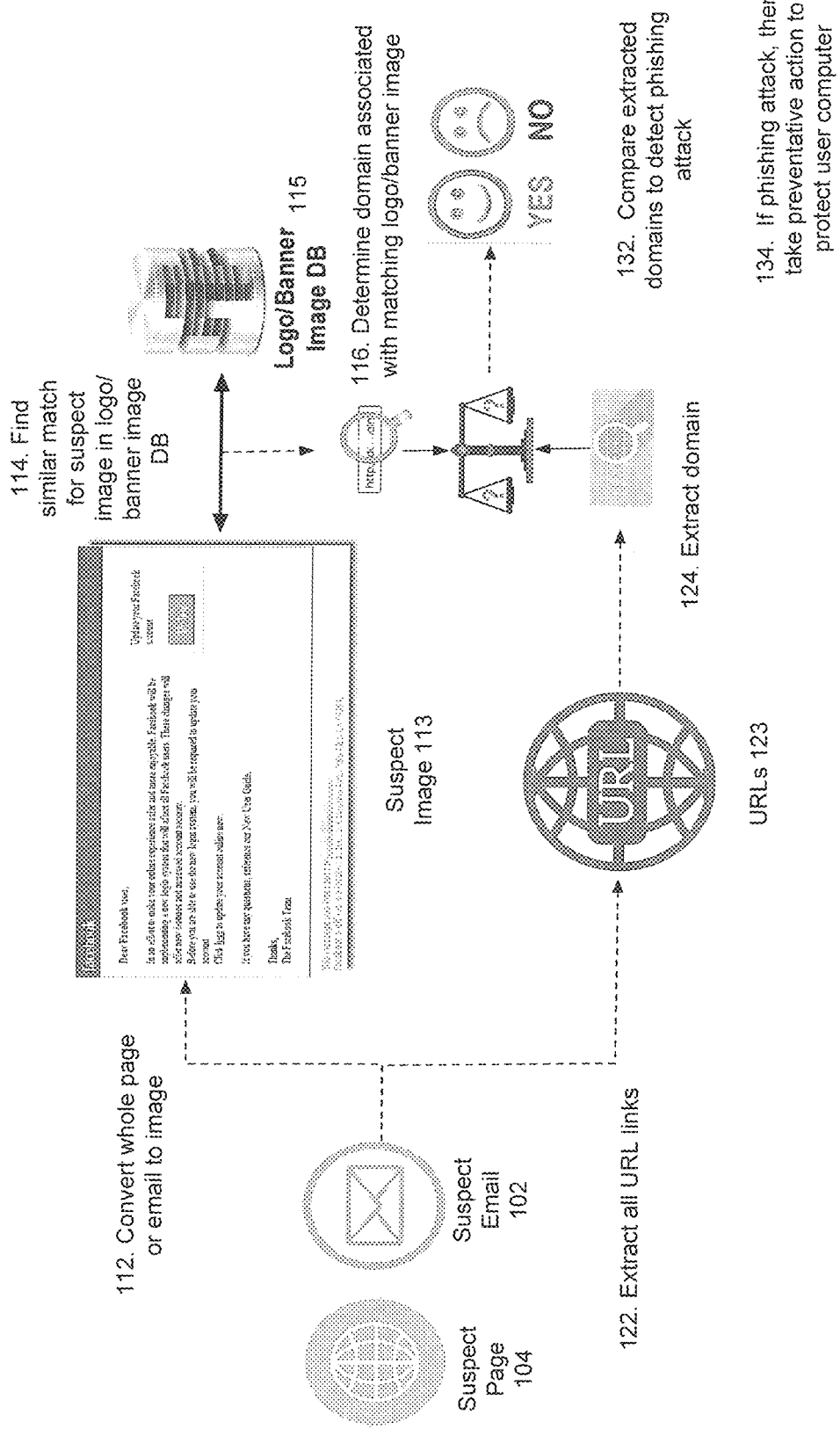
FIG. 1 is a diagram depicting an innovative method to protect a computer user from a phishing attack in accordance with an embodiment of the present invention.

FIG. 1 is a diagram depicting an innovative method 100 to protect a computer user from a phishing attack in accordance with an embodiment of the present invention. The method 100 uses computer vision to match identifiable key information in suspect content against a database of identifiable key information of legitimate content.

As shown in FIG. 1, the method 100 receives suspect content that comprises a suspect email 102 or a suspect web page 104. The suspect content includes one or more universal resource locator (URL) links. Per step 112, the whole page (or whole screen) of suspect content is converted to a suspect image 113 in a digital image format. The conversion may be performed, for example, using a snapshot imaging (screenshot) tool, which may be a third party tool such as from the open source PhantomJS web stack, for instance. The digital image format may be a JPEG format, bitmap format, or other digital image format.

Per step 114, a database 115 of logo and/or banner images is searched to identify a matching logo/banner image. In an exemplary implementation, identification of the matching logo/banner image may be performed using a sub-image matching algorithm that compares sub-images containing a logo or banner from the suspect image 113 against the logo/banner image from the database 115 to find a match.

Note that the logo/banner database 115 may be formed, in a preliminary step (performed before the steps shown in FIG. 1), by extracting the logo and/or banner images from legitimate (official) web sites and associating the logo/banner images with the domain of the legitimate web site. Maintenance of the logo/banner image database 115 may be periodically performed by updating logo/banner images based on current logo/banner images obtained from official web portals or a public search engine.

Per step 116, once the matching logo/banner image is found, the legitimate domain(s) associated with the matching logo/banner image is (are) determined. In one implementation, the legitimate domain(s) are associated with the official logo/banner images in the logo/banner image database 115 and so may be obtained from the database 115.

In addition, per step 122, the presently-disclosed solution extracts all the universal resource locator (URL) links directly from the textual data of the suspect content. Per step 124, further extraction is performed to obtain the suspect domain(s) from those URLs.

Per step 132, the suspect domain(s) is (are) then compared against the legitimate domain(s) to detect whether the suspect content is phishing content or not. If none of the suspect domains are outside (i.e. not amongst) the legitimate domain (s), then no phishing is detected. If any one (or more) of the suspect domains are outside the legitimate domain(s), then phishing is detected.

If phishing is detected, then an action may be performed, per step 134, to protect the user computer. For example, a message warning that the suspect content is malicious phishing content may be provided to the user. As another example, the illegitimate hyperlinks in the phishing content (whether email or web page) may be removed or disabled to prevent the user from going to the phishing site.

Figure 2:
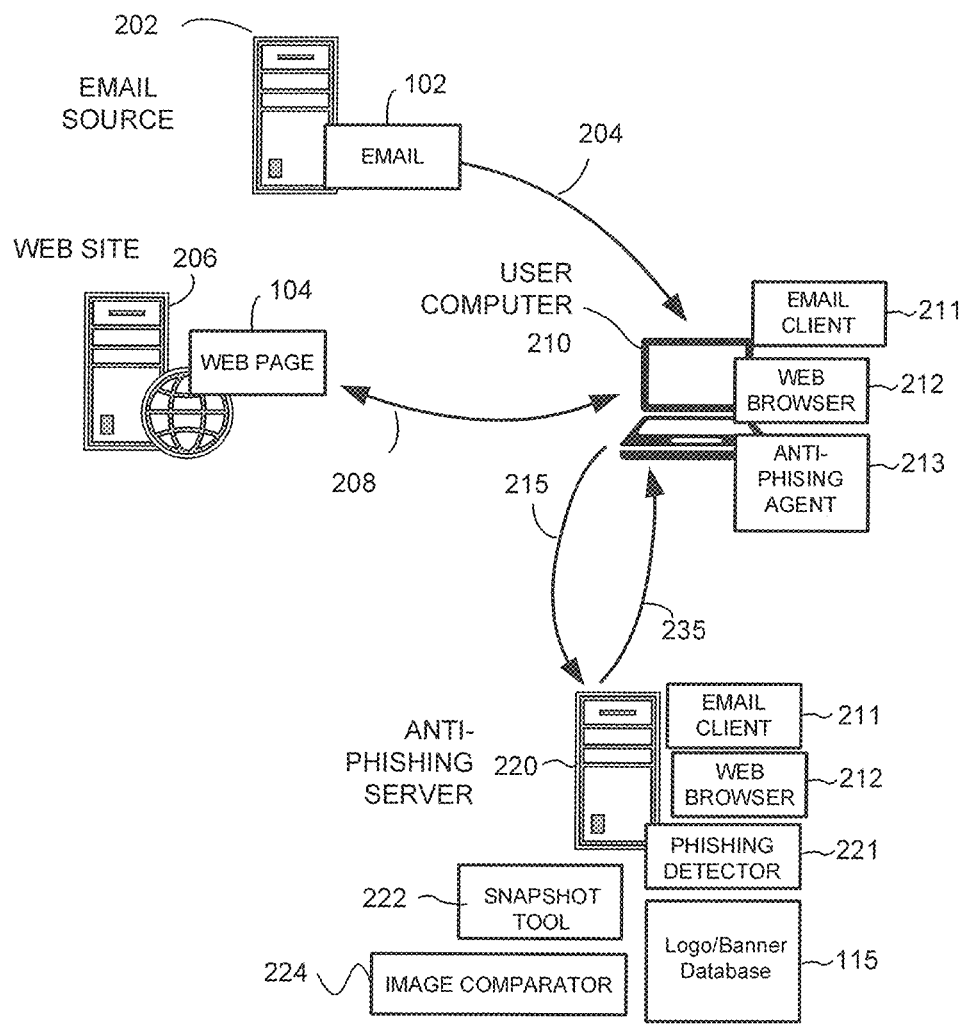
FIG. 2 is a diagram of a system to protect a computer user from a phishing attack in accordance with a first embodiment of the present invention.
Figure 3A:
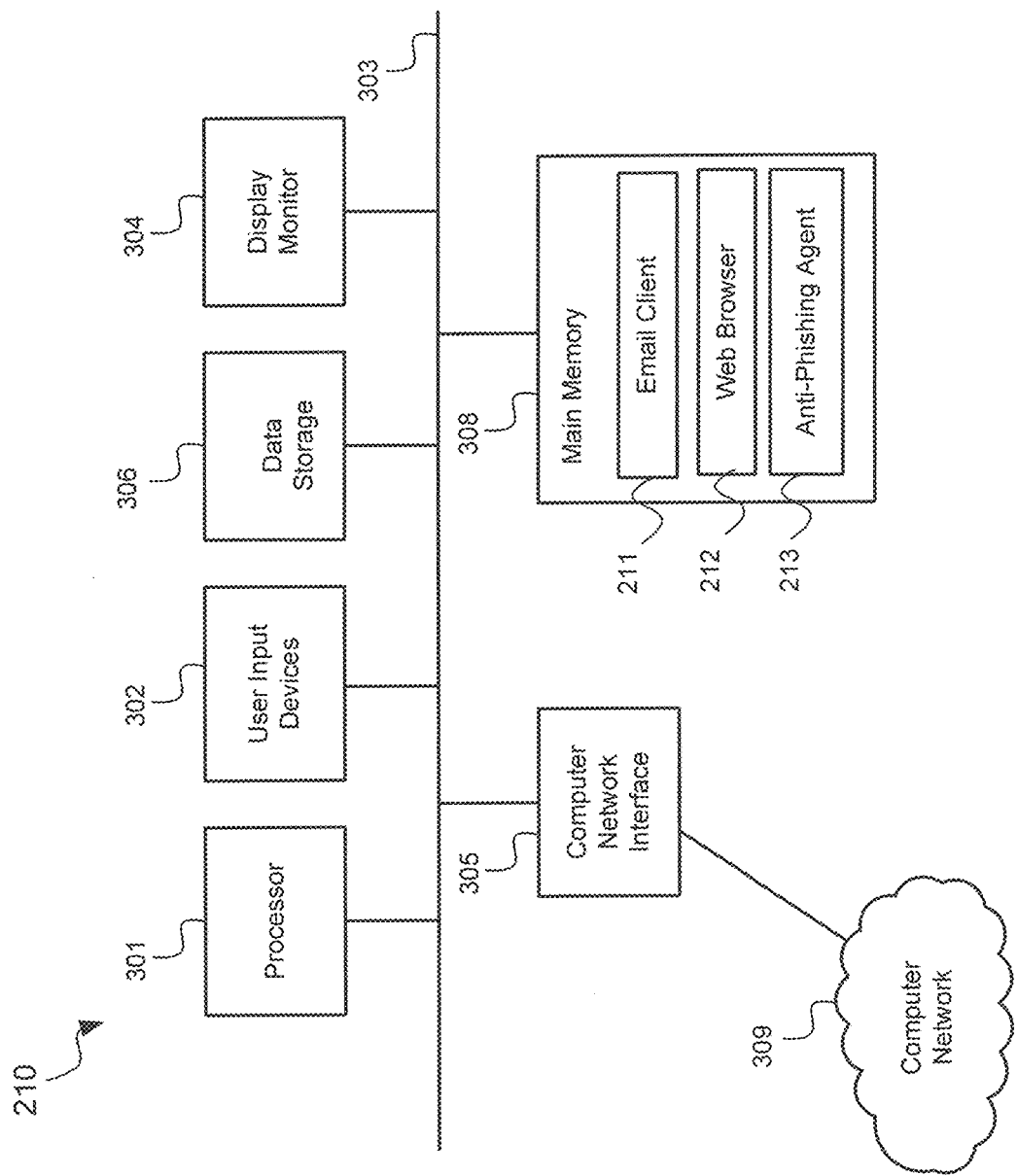
FIG. 3A is a schematic diagram of a user computer in accordance with the first embodiment of the present invention.
Figure 3B:
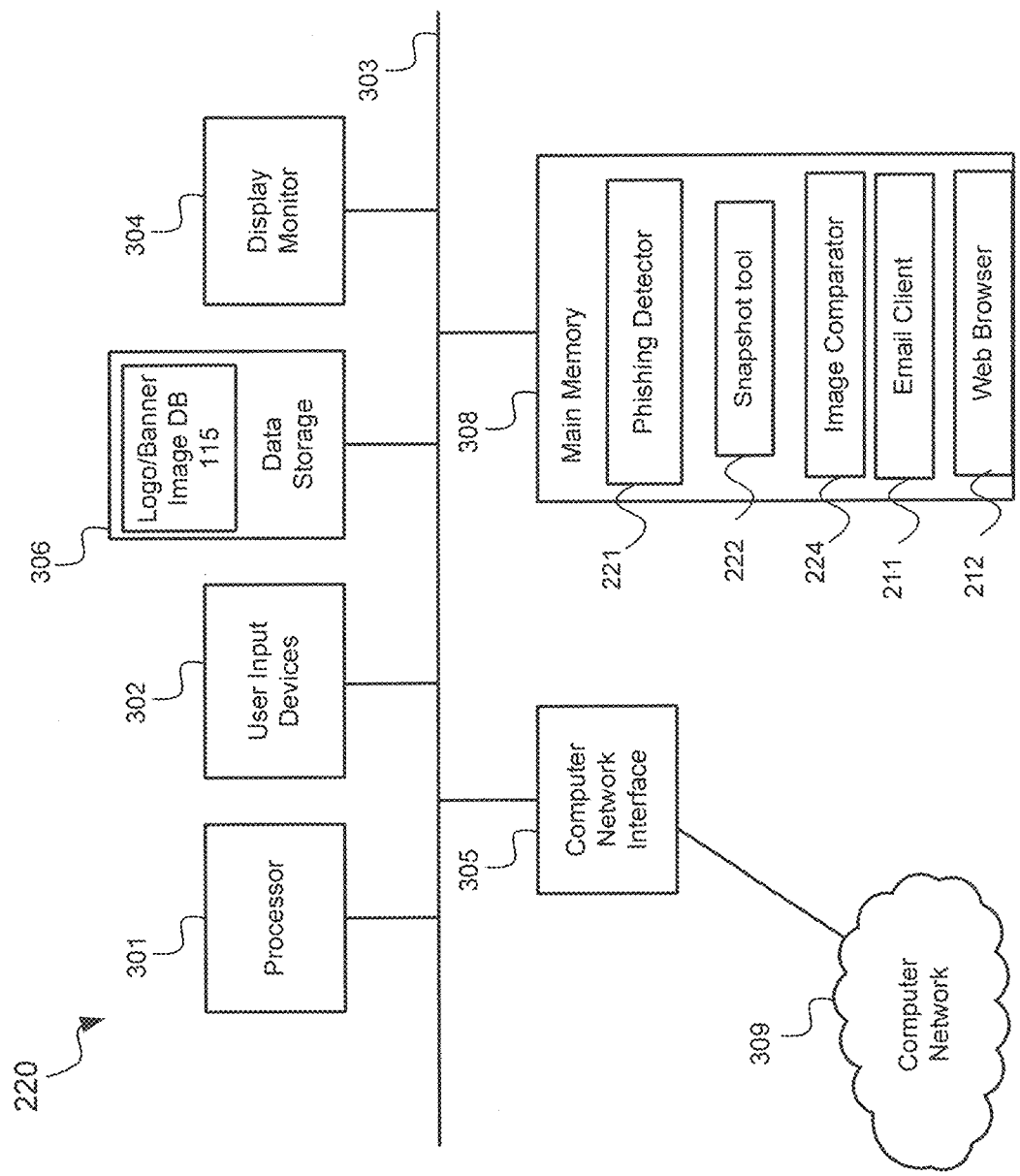
FIG. 3B is a schematic diagram of an anti-phishing server in accordance with the first embodiment of the present invention.

Referring now to FIGS. 2, 3A and 3B, these diagrams depict a system 200 to protect a computer user from a phishing attack in accordance with a first embodiment of the present invention. As shown in FIG. 2, the system 200 may include a user computer 210 and an anti-phishing server 220. Further details of the user computer 210 are shown in FIG. 3A, and further details of the anti-phishing server 220 are shown in FIG. 3B.

As depicted in FIGS. 2 and 3A, the user computer 210 may be configured to execute an electronic mail (email) client 211 that receives (arrow 204 in FIG. 2) email 102 from an email source 202 and a web browser 212 that obtains (bidirectional arrow 208 in FIG. 2) and displays a web page 104 from a web site server 206. In accordance with an embodiment of the invention, the user computer 210 may also be configured to execute the anti-phishing agent 213. In an exemplary implementation, the suspect content (either a suspect email 102 or a suspect web page 104) may be sent in phishing detection query (arrow 215 in FIG. 2) by the anti-phishing agent 213 to the phishing detector 221 at the anti-phishing server 220.

As shown in FIGS. 2 and 3B, the anti-phishing server 220 may be configured to execute the phishing detector 221 which receives the suspect content from the anti-phishing agent 213. The phishing detector 221 may extract all the URL links directly from the suspect content (step 122 in FIG. 1) and further extract suspect domains from those URLs (step 124 in FIG. 1).

In accordance with an embodiment of the invention, the phishing detector 221 may utilize a client application (such as, an email client 211 or a web browser 212) so that a page, as would be viewed by a user, may be captured by the snapshot tool 222 (per step 112 in FIG. 1). The phishing detector 221 may then use the image comparator 224 to compare the image of the suspect content against images of logos and banners in the official logo/banner database 115 to identify a matching logo/banner image from the database 115 (step 114 in FIG. 1).

Note that the suspect content image will generally contain more area than a logo/banner. Hence, the suspect content image will not exactly match a logo/banner image. However, the match should be sufficient to detect the presence of the logo/banner image, or a close copy of the logo/banner image, as being embedded within the suspect image.

Once the matching logo/banner image is found, the phishing detector 221 may use a domain determiner 320 to determine the legitimate domain(s) associated with the matching logo/banner image (step 116 in FIG. 1). In an exemplary implementation, the domain determiner 320 extracts the legitimate domain(s) from the domain(s) or URL(s) associated with the matching logo/banner image in the logo/banner image database.

The suspect domains extracted directly from the suspect content (per step 124) may then be compared against the legitimate domain determined from the matching logo/banner image (per step 116). In an exemplary implementation, this comparison may be performed by the phishing detector 221 at the anti-phishing server 220. The result of the comparison determines whether the suspect content is detected to be phishing or not.

If none of the suspect domains are outside (i.e. not amongst) the legitimate domain(s), then no phishing is detected. If any one (or more) of the suspect domains are outside the legitimate domain(s), then phishing is detected. In an exemplary implementation, the result of the phishing detection may be sent in a response back to the anti-phishing agent 213 of the user computer 210 which sent the query.

If phishing is detected, then the anti-phishing agent 213 may perform an action to protect the user computer. For example, a message warning that the suspect content is malicious phishing content may be provided by the anti-phishing agent 213 to the user. As another example, the illegitimate hyperlinks in the phishing content (whether email or web page) may be removed or disabled by the anti-phishing agent 213 to prevent the user from going to the phishing site.

FIG. 3A depicts, at a high level, components of the computer system for the user computer 210. Similarly, FIG. 3B depicts, at a high level, components of the computer system for the anti-phishing server 220.

These computer systems may be implemented with fewer or more components than shown in FIGS. 3A and 3B. For example, the computer systems may include one or more processors 301 and one or more buses 303 coupling its various components. The computer systems may also include one or more user input devices 302 (e.g., keyboard, mouse), one or more data storage devices 306 (e.g., hard drives, optical disk, Universal Serial Bus memory), one or more display monitors 304 (e.g., liquid crystal display, flat panel monitor), one or more computer network interfaces 305 (e.g., network adapter, modem), and a main memory 308 (i.e., random access memory). As shown, a computer network interface 305 may be coupled to a computer network 309, which in this example, may include the Internet.

The computer systems are each a particular machine as programmed with one or more software modules, comprising instructions stored non-transitory in the main memory 308 for execution by the processor 301. An article of manufacture may be embodied as computer-readable storage medium including instructions that when executed by a processor 301 causes the computer system to be operable to perform the functions of the one or more software modules.

For the user computer 210 depicted in FIG. 3A, the software modules include, among others, the email client 211, the web browser 212, and the anti-phishing agent 213. For the anti-phishing server 220 depicted in FIG. 3B, the software modules include, among others, the phishing detector 221, the snapshot tool 222, and the image comparator 224.

Figure 4:
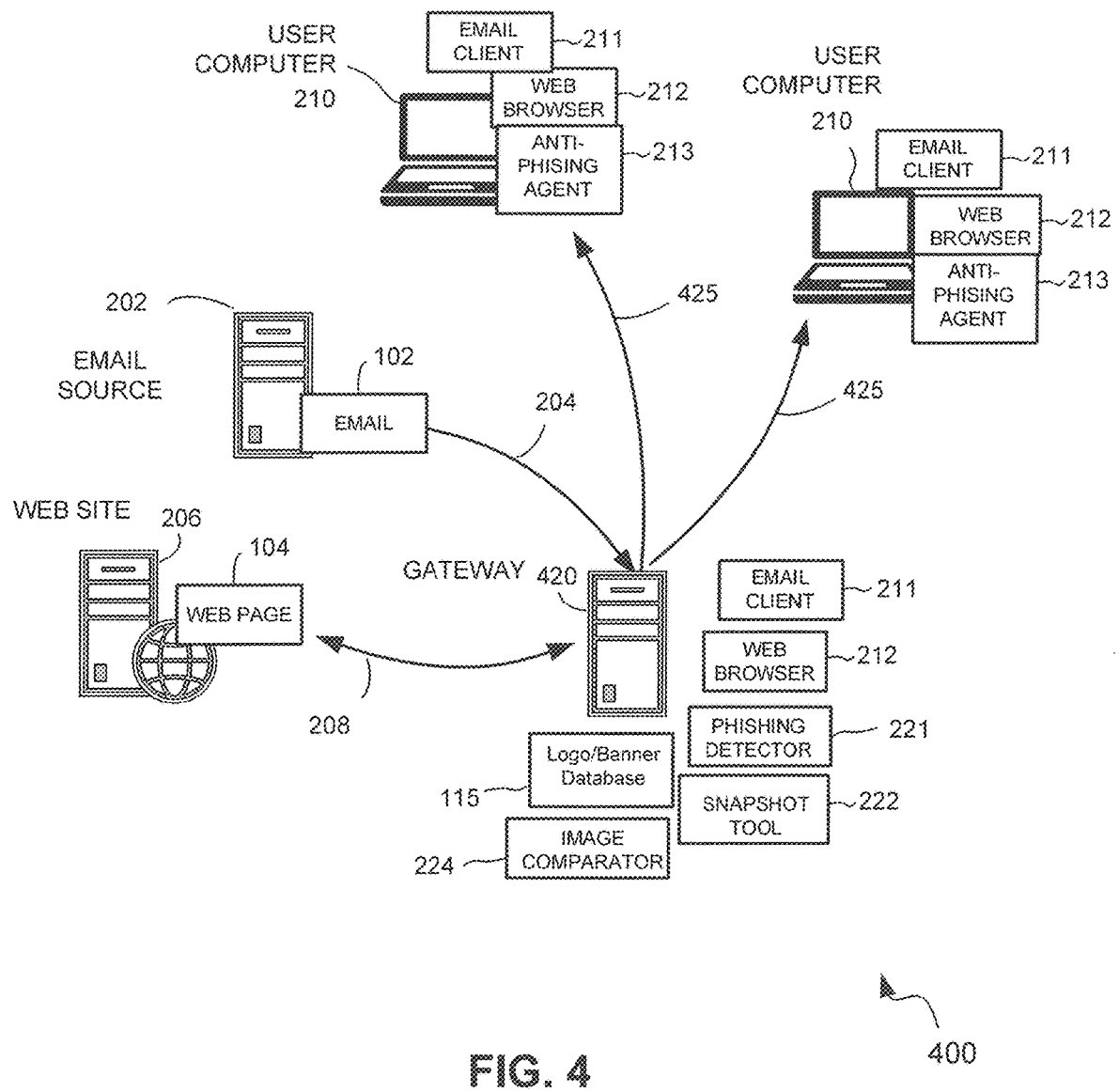
FIG. 4 is a diagram of a system to protect multiple user computers from a phishing attack in accordance with a second embodiment of the present invention.

FIG. 4 is a diagram depicting a system 400 that uses a gateway server 410 which is configured to protect multiple user computers 210 from a phishing attack in accordance with a second embodiment of the present invention. The gateway server 410, in effect, applies the method 100 of FIG. 1 to provide protection for multiple user computers 210.

As shown, the gateway server 410 may include the logo/banner image database 115, the phishing detector 221, the snapshot tool 222, and the image comparator 224. The gateway server 410 may also include an email client 211 and a web browser 212 so that a page, as would be viewed by a user, may be captured by the snapshot tool 222. As such, the phishing detection method 100 may be performed by the gateway server 410 to detect phishing in emails and/or web pages that are being sent to multiple user computers 210 in a network.

When no phishing attack is detected by the gateway server 410, the gateway server 410 may allow the email or web page to be sent to the user computer 210 with no change. On the other hand, when a phishing attack is detected by the gateway server 410, the gateway server 410 may perform an action to protect the targeted user computer 210. For example, the illegitimate hyperlinks in the phishing content (whether email or web page) may be removed or disabled by the phishing detector 221 prior to allowing the email or web page to be sent (arrow 425) to the user computer 210. As another example, a message warning that the suspect content is malicious phishing content may be sent (arrow 425) by the phishing detector 221 to an (optional) anti-phishing agent 213 at the targeted user computer 210.

Methods and systems for detecting phishing using computer vision to match identifiable key information have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method performed at a gateway server for protecting against a phishing attack, the computer-implemented method comprising:
receiving a suspect email message that includes one or more embedded universal resource locator links;
extracting one or more suspect universal resource locators directly from the suspect email message using text processing;
extracting one or more suspect domains from said one or more suspect universal resource locators using said text processing;
generating a page of the email message, as would be viewed by a user, using an email client at the gateway server;
converting said page to a suspect image in a digital image format by a snapshot tool at the gateway server;
searching a database of images of logos and/or banners associated legitimate universal resource locator links using a sub-image matching algorithm to find a matching image which matches a sub-image from the suspect image;
obtaining from the database, one or more legitimate universal resource locator links associated with the matching image;
extracting one or more legitimate domains from said one or more legitimate universal resource locator links associated with the matching image;
comparing said one or more suspect domains against said one or more legitimate domains to determine whether any of the one or more suspect domains is not present amongst said one or more legitimate domains; and
detecting the phishing attack when any of the one or more suspect domains is not present amongst said one or more legitimate domains,
wherein the database containing said images of logos and/or banners and said associated legitimate universal resource locator links is periodically updated.

2. The computer-implemented method of claim 1 further comprising:
taking preventative action against the phishing attack.

3. The computer-implemented method of claim 2, wherein the preventative action comprises disabling a hyperlink capability of a suspect universal resource locator link which does not have a legitimate domain from the suspect content.

4. A system for protecting against a phishing attack, the system comprising:
a gateway server comprising a phishing detector which is configured to:
receive a suspect email message, that includes one or more embedded universal resource locator links,
extract one or more suspect universal resource locator links directly from the suspect email message using a text processing procedure;
extract one or more suspect domains from said one or more suspect universal resource locator links using said text processing procedure;
generate a page of the suspect email message, as would be viewed by a user, using an email client at the gateway server;
convert said page to a suspect image in a digital format by a snapshot tool at the gateway;
search a database of images of logos and/or banners and associated legitimate domains using a sub-image matching algorithm to find a matching image which matches a sub-image from the suspect image;
extract, from the database, one or more legitimate domains associated with the matching image;
compare said one or more suspect domains against said one or more legitimate domains associated with the matching image to determine whether any of the one or more suspect domains is not present amongst said one or more legitimate domains associated with the matching image; and
detect the phishing attack when any of the one or more suspect domains is not present amongst said one or more legitimate domains associated with the matching image,
wherein the database containing said images of logos and/or banners and said associated legitimate domains is periodically updated; and
a plurality of user computers which are protected from the phishing attack by the gateway server.

5. The system of claim 4, wherein the phishing detector is further configured to perform preventative action against the phishing attack.

6. The system of claim 5, wherein the preventative action comprises disabling a hyperlink capability of a universal resource locator link in the suspect content when said universal resource locator link has a suspect domain that is not amongst the one or more legitimate domains.

7. A computer-implemented phishing detector comprising:
- a processor for executing computer-readable code;
- memory for storing and accessing the computer-readable code and data;
- computer-readable code configured to receive a suspect email message that includes one or more embedded universal resource locator links,
- computer-readable code configured to extract one or more suspect universal resource locator links directly from the suspect webpage using text processing;
- computer-readable code configured to extract one or more suspect domains from said one or more suspect universal resource locator links using said text processing;
- computer-readable code configured to generate a page of the email message, as would be viewed by a user, using an email client;
- computer-readable code configured to convert said page to a suspect image in a digital image format by snapshot tool;
- computer-readable code configured to search a database of images of logos and/or banners and associated legitimate domains to find a matching image which matches a sub-image of the suspect image;
- computer-readable code configured to obtain, from the database, one or more legitimate domains associated with the matching image;
- computer-readable code configured to extract one or more suspect universal resource locator links directly from the suspect content;
- computer-readable code configured to extract one or more suspect domains from said one or more suspect universal resource locator links;
- computer-readable code configured to compare said one or more suspect domains against said one or more legitimate domains associated with the matching image to determine whether any of the one or more suspect domains is not present amongst said one or more legitimate domains associated with the matching image; and
- computer-readable code configured to detect the phishing attack when any of the one or more suspect domains is not present amongst said one or more legitimate domains associated with the matching image,
- wherein the database containing said images of logos and/or banners and said associated legitimate domains is periodically updated.

8. The computer-implemented phishing detector of claim 7, further comprising:
- computer-readable code configured to perform preventative action against the phishing attack.

9. The computer-implemented phishing detector of claim 8, wherein the preventative action comprises disabling a hyperlink capability of a suspect universal resource locator link which does not have a legitimate domain from the suspect content.

* * * * *